June 21, 1960  W. T. GRAHAM  2,941,607
CLAMP FOR VIBRATING SHANK PLOW
Filed May 17, 1957  2 Sheets-Sheet 1

INVENTOR.
William T. Graham.
BY
Fishburn & Gold
ATTORNEYS.

June 21, 1960 W. T. GRAHAM 2,941,607
CLAMP FOR VIBRATING SHANK PLOW
Filed May 17, 1957 2 Sheets-Sheet 2

INVENTOR.
William T. Graham.
BY
Fishburn & Gold
ATTORNEYS.

United States Patent Office 2,941,607
Patented June 21, 1960

2,941,607

CLAMP FOR VIBRATING SHANK PLOW

William T. Graham, P.O. Box 2050, Amarillo, Tex.

Filed May 17, 1957, Ser. No. 659,876

1 Claim. (Cl. 172—710)

This invention relates to plows of a type including a plurality of laterally arranged ground conditioning tools that work under the surface of the ground to heave and break the soil and form alternate ridges and furrows having exposed surfaces and whereby the straw and other natural mulching material normally occurring on a field remains on top of the ground, the present invention being directed to the fastening of the ground conditioning tools to the frame of the plow and to an improvement on the inventions disclosed in my patent numbered 2,493,811.

In the plows disclosed in the said patents the ground working tools are provided with shanks that are adapted to rock relatively to the frame when the plow is in operation in a forward direction to give vibratory action and to permit the tools to ride over rocks and other obstructions that may be encountered in the soil and thereby avoid damage to the plow parts and plow frame.

The tool mounting includes a clamp having one part fixed to the frame and another part pivotally mounted on the fixed part with the end of the shank engaged between said parts in one form and under the movable part in another form under action of a coil spring which has one end in engagement with one of the parts and the other end connected with the other part in a manner to form a stop for preventing disengagement of the shank from the clamp. The mountings disclosed in the patent operate satisfactorily but shifting of the parts and wear on some of the parts tends to allow the shanks to turn sideways allowing the points of the ground working tools to work in a sidewise direction.

It is, therefore, an object of the present invention to provide a movable part of the clamp with an enclosed end through which the end of the shank extends and is secured therein to prevent sideways turning of the shank during rocking operation of the plow shanks and to prevent wear of various parts which increases the sideways movement of the shank.

Other objects of the present invention are to provide the fixed part of the clamp with a rounded fulcrum point at the rear thereof against which the shank moves when pressure is applied to the shank; to provide said fulcrum point on the fixed part slightly forwardly of the fulcrum point of the movable part of the clamp with respect to the fixed part; to provide the forward portion of the fixed part with a slot-like opening at an angle from the vertical so that the spring will be set at an angle and the movable part is provided with a slot-like opening conforming to but slightly longer than the slot in the fixed part whereby when the movable part is moved away from the fixed part the spring will be compressed in a straight line direction and will not wobble forwardly or backwardly; to provide a housing on the forward end of the movable part with means wherein the shank will be attached thereto to take the thrust off of the spring pin and thus prevent wear of the movable and fixed parts where the spring pin moves therein; to provide means for securing the shank and movable member together; to provide the forwardly extending portion of the fixed part with an opening whereby the means of fastening the shank and movable part together may be extended through the fixed part to provide a non-resilient structure wherein the spring mechanism will be inoperative; to provide a device wherein the movable part is pivotally mounted above the shank and on the fixed part and the shank is below the movable part, and to provide a device of this character simple and economical to manufacture.

In accomplishing these and other objects, I have provided improved details of structure, the preferred forms of which are shown in the accompanying drawings, wherein:

Fig. 1 is a vertical section through a frame member of the plow showing a mounting constructed in accordance with the present invention for resiliently attaching the shanks to the ground working tools whereby the shanks are adapted to rock relative to the frame in passing over an obstruction and return to normal position after the obstruction has been passed, and particularly illustrating the housing on the movable member.

Figure 6:
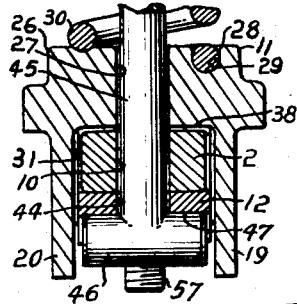
Fig. 6 is a cross-sectional view taken on a line 6—6, Fig. 2, particularly illustrating the T-shaped lower end of the spring post engaging in a groove provided in the movable member.
Figure 1:
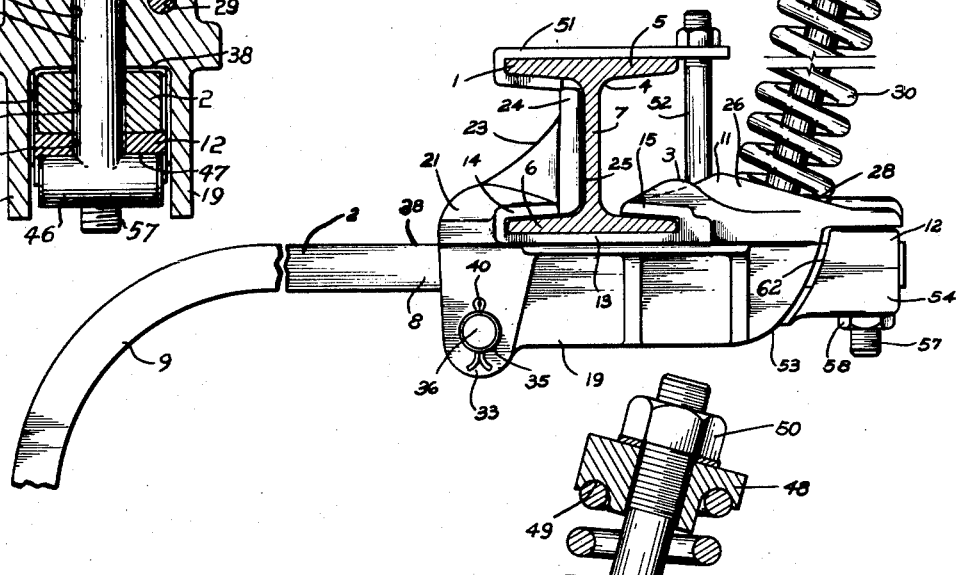

Referring more in detail to the drawings:

1 designates a part of the plow frame to which the shanks 2 of the ground working tool (not shown, but as illustrated in Patent No. 2,493,811) are attached by mountings generally indicated 3 and constructed in accordance with the present invention. Since all of the tool, shank and mounting assemblies are of like construction, only one of them is illustrated and described, it being understood that the plow may include one or more of the ground working devices.

The frame member 1 which comprises a part of a plow frame is illustrated as comprising an I-beam 4 having upper and lower horizontally arranged flanges 5 and 6 that are interconnected by a vertical web 7. The shank 2 is formed of metal bar stock of substantially rectangular cross-section and is of a width and thickness to provide the necessary strength and a certain amount of resiliency. The bar stock is shaped to provide a substantially straight end portion 8 extending in direction of travel of the machine and rearwardly and downwardly curved portion 9 terminating in a forwardly curved end (not shown, but also illustrated in my said patent) to carry the ground working tool. The straight end 8 of the shank extends transversely with respect to the frame member 1 which is adapted to rock transversely relative to travel of the plow and is provided with an elongated opening 10 for a purpose later described.

Each mounting 3 includes a fixed part 11 and a movable part 12. The fixed part 11 has a substantially flat plate portion 13 substantially corresponding in length to the width of the lower flange 6 of the I-beam and which is closely engaged therewith by flanges 14 and 15. The length of the plate portion 13 is such as to provide an ample contact area with the flanges 6 so as to allow a firm connection when the clamp is fastened to its beam by a set screw 16 threaded through a boss 17 formed on the upper face of the flange 14 so that the end thereof bears against the upper face and flange to draw the plate portion 13 of the clamp tightly against the bottom face of the beam.

Extending from the under side of each clamp member 11 are spaced flanges 19 and 20. Projecting rearwardly therefrom are spaced extensions 21 and 22 that extend upwardly over the flange 14 and carry webs 23 which support abutments 24 which engage the rear face of the I-beam web 7 as indicated at 25 for distributing forces acting on the shank to the upper portion of the I-beam.

Extending forwardly from the plate portion 13 is an extension 26 forming a relatively thicker portion having a slot-like opening 27 extending therethrough providing a seat 28 having a groove 29 for a coil spring 30 as later described. The flanges 19 and 20 are spaced apart to form a downwardly open channel or way 31 therebetween and in which the end portion 8 of the shank 2 is adapted to rock with the movable member 12. The flanges 19 and 20 extend forwardly of the plate portion of the clamp member 11 on the respective sides of the forward extension 26.

Formed on the flanges 19 and 20 at the rear end thereof and depending from the extensions 21 and 22 are ears 33 and 34 having transverse openings 35 in which are mounted the ends of a fulcrum or pivot pin 36 that extends across the way or channel 31, the pin 36 being carried in spaced relation with the plate portion 13 to accommodate therebetween the end portion of the shank 2 of the ground working device and the fulcrum plate or shank attaching member 12. The under side of the plate portion 13 forms a clamping portion or face 37 conforming with the upper face 38 of the end portion of the shank. The pin 36 is provided with transverse openings 39 through which cotter pins or the like 40 are adapted to extend to retain the pin in place.

The movable member or fulcrum plate 12 is provided at its rear end with an enlarged portion 41 extending downwardly as indicated at 42 and has a transverse opening 43 through which the pin 36 extends to pivotally mount the movable member on the fixed member.

Figure 2:
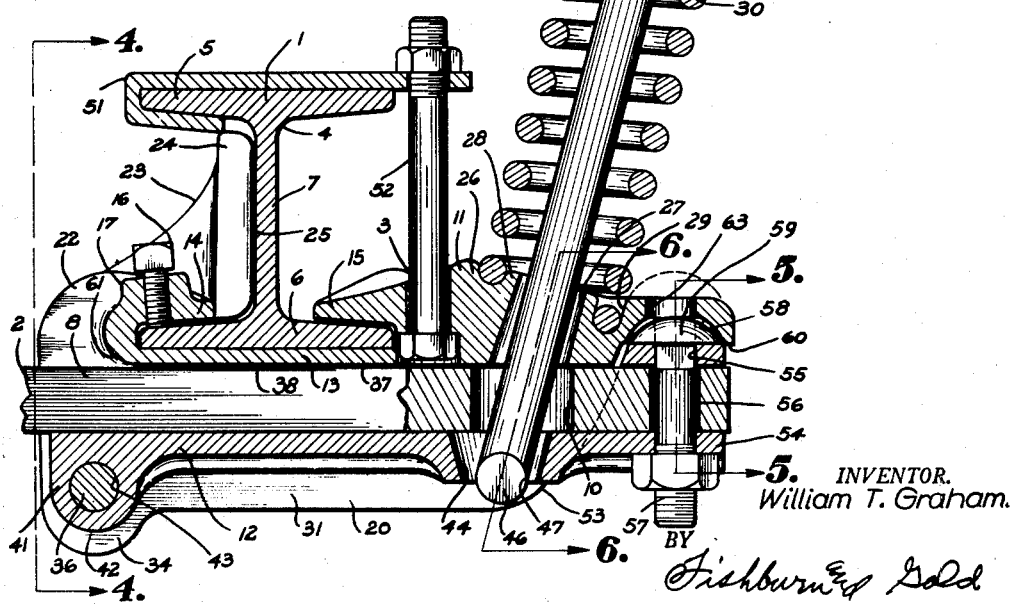
Fig. 2 is an enlarged longitudinal section through the frame, the plow shank and the mounting by which the shank is pivotally connected with the frame member and resiliently held in normal plowing position, taken on a line 2—2, Fig. 4, and particularly illustrating the housing on the forward end of the movable member.
Figure 3:
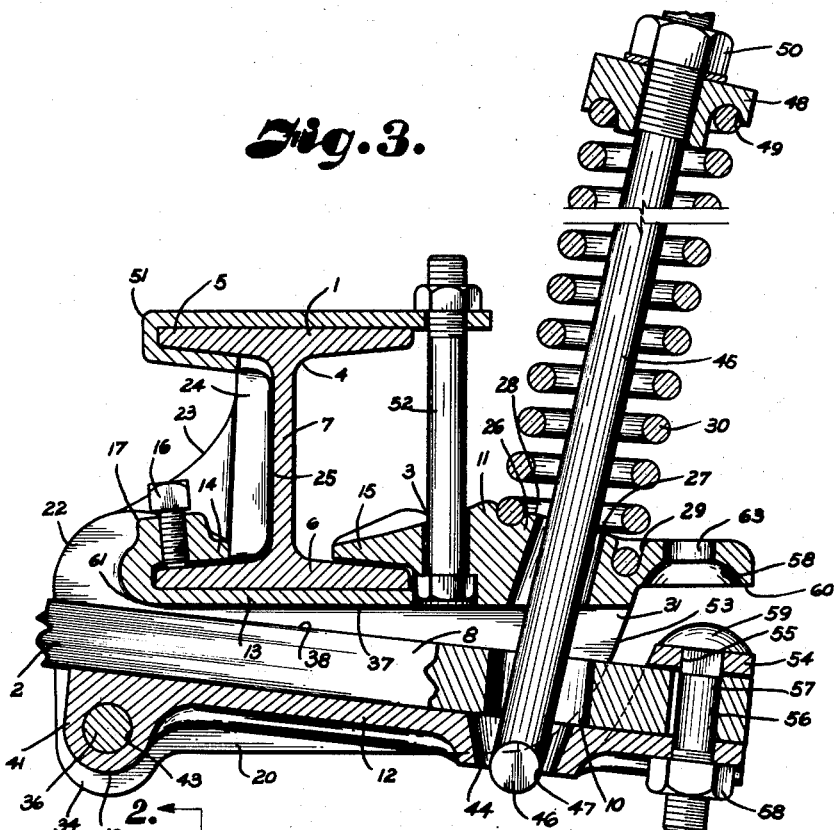
Fig. 3 is a longitudinal section similar to Fig. 2 but showing the shank and movable member rocked relative to the fixed part of the mounting.
Figure 4:
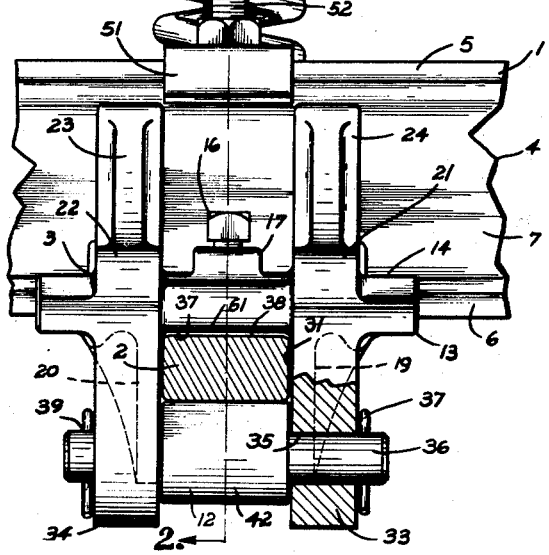
Fig. 4 is a rear elevational view of the device with the shank being shown in cross section.
Figure 5:
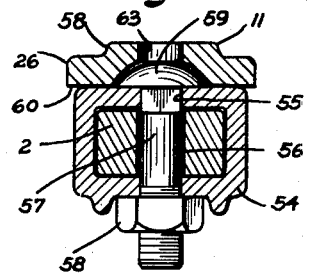
Fig. 5 is a cross-sectional view taken on a line 5—5, Fig. 2.

The fulcrum plate or movable member 12 is provided with a slot or opening 44 spaced from the forward end aligning with but partially offset from the openings 10 and 26, respectively, in the forward end of the shank 8 and the extension 26 of the fixed member as illustrated in Figs. 2 and 3 for receiving a spring rod 45 which extends through the openings and through the coil spring 30. The spring rod 45 has a T-head 46 which engages in a transverse groove 47 on the bottom of the forward end of the movable member. The upper end of the rod extends above the spring 30 and is threaded. A washer 48 having a groove 49 engages over the end of the rod and accommodates the end of the coil spring 30 and a threaded nut 50 holds the washer thereon and capable of being tightened on the rod to compress the spring 30 sufficiently to retain the shank and movable part in normal position but to allow rocking movement of the movable part when the shank is rocked. This rocking movement of the shank will cause the movable part to pivot away from the fixed part along with the forward end portion of the shank to effect compression of the spring so that the stored up action in the spring will return the shank and movable part of the clamp to normal position with the plate portion resiliently clamped against the fixed part of the mounting as shown in Fig. 2.

In order to further attach the fixed part to the I-beam of the plow the mounting may include a hooked member 51 which engages the upper flange of the I-beam and has a bolt 52 engaging through the extension 26 of the fixed member as disclosed in my Patent 2,627,798.

The forward portion of the side flanges 19 and 20 are curved as indicated at 53 and the forward end of the movable member or fulcrum plate 12 is provided with a housing or sleeve member 54 through which the end of the shank extends, the housing being rectangular in shape so that the end of the shank fits therein and prevents sidewise movement or twisting movement of the shank. The housing is provided with an opening 55 and the forward end of the shank is also provided with an opening 56 to receive a bolt 57 the threaded end being adapted to receive a nut 58. The opening 56 is slightly larger than the diameter of the bolt to permit slight longitudinal movement of the end portion of the shank relative to the pivotal part of the clamp, and when the shank moves rearwardly the opening 10 therein will align with the opening 27 in the forward extension 26 on the fixed member 11. The extension 26 of the fixed member is recessed as indicated at 58 to accommodate the head 59 of the bolt 57. The extension is also cut away at the forward end or recessed as indicated at 60 to provide room for the housing 54 as best illustrated in Fig. 2. The bolt 57 will exert its force when tightened on the sleeve 54 and the nut will not work loose. The bolt will not tighten on the shank, but the shank remains free to move in the sleeve 54.

In applying the clamp to the frame, the clamping part of the fixed member is passed over the flange 6 at one end of the beam and shifted therealong to its desired position with the clamping flanges 14 and 15 resting upon the upper faces of the flange 6 of the I-beam. The set screws 16 are then applied and tightened to draw the clamping flanges into clamping contact with the upper faces of the flange 6. The hook member 51 and bolt 52 are then applied as illustrated and described in my Patent No. 2,672,798. The movable member 12 is placed between the deep ending ears 33 and 34 and between the flanges 19 and 20. The pin 36 is inserted in the opening 35 in the ears 33, opening 43 in the fulcrum plate and opening 35 in the ear 34 to pivotally mount the fulcrum plate 12 on the fixed member. The spring rod and spring are then assembled through the openings in the fulcrum plate, shank and extension of the mounting and the bolt 57 inserted through the forward end of the shank and sleeve 54 of the fulcrum plate.

It will be particularly noted that the rear portion of the fixed member 11, and particularly the rear part of the plate 13 is rounded as indicated at 61 providing a fulcrum for the shank to engage against when the plow is in operation and pressure is exerted upwardly on the shank. The fulcrum point is slightly forward of the pin 36 to allow free rocking movement around the fulcrum point and to prevent wear due to contact of the shank against the bracket or fixed part. When the pressure on the shank overcomes the tension of the spring 30 the forward end of the shank will move away from the fixed part as illustrated in Fig. 3 and the stress or rearward action on the shank will cause the shank to move rearwardly or longitudinally so that the bolt 57 will take the majority of the thrust of the shank. The rear edge 62 of the housing or sleeve may also engage against the curved portion 53 of the side flanges to also take some of the thrust. The force on the shank during rocking action of the fulcrum member due to the housing and bolt at the forward end of the fulcrum member will prevent friction on the spring bolt 45 through the openings in the shank, fulcrum and extension 26 through which it extends and thus prevent wear thereon, and at the same time allowing free and easy rocking movement of the clamp.

The fulcrum 61 allows the shank to rock therearound and, being slightly forwardly of the pin 36, when the shank rocks the fulcrum 61 and pin 36 acts as a stop to limit rocking movement of the shank and thus take the strain off of the spring 30.

Should it be desired to operate the clamp as a fixed clamp or, in other words, to render the spring arrangement inoperative and prevent the shank from moving away from the fixed part, the bolt 57 is made sufficiently long to extend through the opening 63 in the extension 26 of the fixed member so that the fulcrum plate and shank will be securely attached in the fixed member so that there will be no rocking action of the clamp.

It will be obvious from the foregoing that I have provided an improved mounting of the shank of a ground working tool wherein the movable member of the mounting of the shank is provided with means for preventing sidewise tipping movement of the shank and wherein the thrust of the shank is retained out of contact with the spring bolt to allow easy and free movement of the spring and bolt and to prevent wear of the moving parts.

What I claim and desire to secure by Letters Patent is:

In a plow having a frame and a ground working tool provided with a shank adapted to rock relative to the frame when the plow is in operation in a forward direction, a mounting for attaching and supporting the shank of the ground working tool from the frame including a clamping part fixed to the frame and having an extension forwardly of said frame provided with an opening extending at an angle forwardly and upwardly therethrough from bottom to top and a second opening spaced forwardly of the first-named opening, a shank attaching member having an elongated plate portion for engagement with the forward portion of the shank with said shank portion between said plate portion and the clamping part, means pivotally attaching said shank attaching member adjacent the rearward end thereof to the clamping part of said mounting, said clamping part having spaced depending flanges forming a downwardly opening way, said flanges being curved at their forward edges, said shank attaching member being operable in said way, a bearing portion on the clamping part for engagement by the shank forwardly of the pivoting means when the shank is rocked, an upstanding sleeve on the forward end of the plate portion of said shank attaching member with a longitudinal passage therein through which the forward portion of the shank extends, said sleeve and shank having aligned openings spaced from the end thereof aligning with the second-named opening in said clamping part, said sleeve being rectangular in cross-section and closely embracing said shank to prevent the shank from twisting while permitting relative longitudinal movement of said shank and sleeve, said plate portion and said shank having elongate openings therethrough aligned with the first-named opening in the clamping part, a coil spring having one end seated at an angle on said extension of the clamping part, the upper rear edge of the sleeve being curved to fit the curved portion of the depending flanges on the clamping part, a rod extending through said second-named openings in the shank and plate portion of the shank attaching member and first-named opening in the extension of the clamping part and having connection with the other end of the coil spring, means on said rod engaging said plate portion of the shank attaching member adjacent the sleeve whereby the spring yieldably maintains the normal depth of the ground working tool but allows the forward end of the shank to move upon rocking movement of the shank, and a bolt extending through the first-named openings in the shank and sleeve to retain the shank in said sleeve, said opening in the shank being slightly larger than the bolt to permit longitudinal movement of the shank relative to the shank attaching member when they are under rocking movement with the bolt taking the thrust from said shank and preventing same from exertion on said rod connecting the coil spring to said shank attaching member.

References Cited in the file of this patent
UNITED STATES PATENTS

| | | |
|---|---|---|
| 976,490 | Packham et al. | Nov. 22, 1910 |
| 2,493,811 | Graham | Jan. 10, 1950 |
| 2,627,798 | Graham | Feb. 10, 1953 |

FOREIGN PATENTS

| | | |
|---|---|---|
| 253,298 | Great Britain | of 1926 |